United States Patent
Sallakonda et al.

(10) Patent No.: US 10,445,675 B2
(45) Date of Patent: Oct. 15, 2019

(54) CONFIRMING ENFORCEMENT OF BUSINESS RULES SPECIFIED IN A DATA ACCESS TIER OF A MULTI-TIER APPLICATION

(75) Inventors: Satish Kumar Sallakonda, Dublin, CA (US); Rambabu Dola, Hyderabad (IN); Vinay Babu Vegunta, Milpitas, CA (US); Jayavel Bharathi, Hyderabad (IN); Ravikumar Venkata Moolaveesla, Hyderabad (IN)

(73) Assignee: Oracle International Corporation, Redwood Shores, CA (US)

( * ) Notice: Subject to any disclaimer, the term of this patent is extended or adjusted under 35 U.S.C. 154(b) by 1660 days.

(21) Appl. No.: 12/477,905

(22) Filed: Jun. 3, 2009

(65) Prior Publication Data
US 2010/0312592 A1 Dec. 9, 2010

(51) Int. Cl.
G06Q 40/00 (2012.01)
G06F 7/00 (2006.01)
G06Q 10/06 (2012.01)
G06Q 10/10 (2012.01)

(52) U.S. Cl.
CPC ....... *G06Q 10/06375* (2013.01); *G06Q 10/10* (2013.01)

(58) Field of Classification Search
CPC .................. G06Q 10/10; G06Q 10/06375
USPC .............................................. 705/7; 717/123
See application file for complete search history.

(56) References Cited

U.S. PATENT DOCUMENTS

| | | | |
|---|---|---|---|
| 7,020,869 B2 | 3/2006 | Abrari et al. | |
| 7,707,155 B2* | 4/2010 | Chaushev | G06Q 10/10 707/999.101 |
| 7,752,094 B2* | 7/2010 | Davidson | G06Q 20/207 705/31 |
| 7,822,732 B2* | 10/2010 | Bodapati | G06F 16/951 707/706 |
| 7,899,838 B1* | 3/2011 | Govindasamy | G06F 16/20 707/760 |

(Continued)

OTHER PUBLICATIONS

"A Simple Ironpython Business Object Validation Framework", "http://www.codevoyeur.com/Articles/5/A-Simple-IronPython-Business-Object-Validation-Framework.aspx", Downloaded Circa: Nov. 11, 2008, pp. 1-4.

(Continued)

*Primary Examiner* — Talia F Crawley
(74) *Attorney, Agent, or Firm* — IPHORIZONS PLLC; Narendra Reddy Thappeta

(57) ABSTRACT

Confirming enforcement of business rules specified in a data access tier of a multi-tier enterprise application. In an embodiment, a testing tool programmatically identifies the attributes in the data access tier that are accessible from a set of higher/interface tiers and provides the identified attributes to a user using a suitable interface. The user then specifies a set of test cases based on the provided attributes, with each test case including data elements associated with respective attributes and an expected result if the data elements are sought to be stored in the respective attributes of a data storage. The testing tool determines a validation result of operation of business rules against the combination of data elements and respective attributes. The testing tool then indicates that the business rules are enforced as desired, if the validation result is the same as the expected result.

17 Claims, 15 Drawing Sheets

(56) References Cited

U.S. PATENT DOCUMENTS

| | | | |
|---|---|---|---|
| 2001/0044795 A1* | 11/2001 | Cohen | G06F 16/9535 |
| 2003/0018486 A1* | 1/2003 | Feldman | G06N 5/003 |
| | | | 706/47 |
| 2005/0204340 A1* | 9/2005 | Ruminer | G06F 8/70 |
| | | | 717/123 |
| 2007/0239570 A1* | 10/2007 | Kam-Chak Cheng | |
| | | | G06Q 10/10 |
| | | | 705/35 |
| 2008/0059520 A1 | 3/2008 | Moss | |

OTHER PUBLICATIONS

"Automated Underwriting", "http://jarustech.com/web/autouw.html", Downloaded Circa: Nov. 11, 2008, pp. 1-2.

"Steven Núñez", "Blaze Advisor 6.5 Springs Forward, Falls Back", "http://www.infoworld.com/article/07/11/19/47TC-blaze-advisor-brms_1.html", Downloaded Circa: Nov. 11, 2008, pp. 1-3.

Lauri L. Boyd, Sandra Muller, and Jan Kettenis, "Business Rules in the ADF BC", Dated: Aug. 2007, pp. 1-73.

"Fit for Rules—Keep Your Business Rules in Shape", "http://fit-for-rules.sourceforge.net/", Downloaded Circa: Nov. 11, 2008, pp. 1-2.

"Ideablade Announces Devforce 3.5 With Validation Engine", "http://www.ideablade.com/forum/forum_posts.asp?TID=81", Downloaded Circa: Nov. 11, 2008, pp. 1-2.

"ILOG Jrules Rule Scenario Manager", Copyright Dated: Nov. 2005, pp. 1-2.

"Lynn Munsinger", "Oracle Application Development Framework Overview", Dated: Feb. 2006, pp. 1-11.

"Ken Chu et al,", "Oracle Application Development Framework", Dated: Jun. 2006, pp. 1-1160.

"David Willmor and Suzanne M Embury", "Testing the Implementation of Business Rules Using Intensional Database Tests", "Informatics Process Group—School of Computer Science—The University of Manchester", Downloaded Circa: Nov. 11, 2008, pp. 1-16.

"Testing the Implementation of Business Rules Using Intensional Database Tests—Abstract", "http://ieeexplore.ieee.org/xpls/abs_all.jsp?arnumber=1691677&isnumber=35654", Downloaded Circa: Nov. 11, 2008, pp. 1-1.

"Aaron Skonnard, and Dan Sullivan", "Web Services—Extend the ASP.Net Webmethod Framework With Business Rules Validation", "http://crawlmsdn.microsoft.com/en-us/magazine/cc164100.aspx", Downloaded Circa: Nov. 11, 2008, pp. 1-13.

* cited by examiner

```
401: <AppModule xmlns="http://xmlns.acme.com/bc4j" Name="EnrollmentSetupAM"
402:     ComponentClass="acme.apps.enrollments.model.applicationModule.EnrollmentSetupAMImpl"
403:     DefClass="acme.apps.common.ApplicationModuleDefImpl" ClearCacheOnRollback="true">
404:   <ViewUsage Name="AttendanceSchemeVO"
405:     ViewObjectName="acme.apps.enrollments.model.view.AttendanceSchemeVO" />
406:   <ViewUsage Name="EnrollmentJustificationVO"
407:     ViewObjectName="acme.apps.enrollments.model.view.EnrollmentJustificationVO" />
408:   <ViewUsage Name="EnrollmentSchemeVO"
409:     ViewObjectName="acme.apps.enrollments.model.view.EnrollmentSchemeVO" />
410:   ...
411:   <ViewUsage Name="StatusSchemeValueVO"
412:     ViewObjectName="acme.apps.enrollments.model.view.StatusSchemeValueVO" />
413:   ...
414: </AppModule>
```

*FIG. 4A*

```
415: <ViewObject xmlns="http://xmlns.acme.com/bc4j" Name="AttendanceSchemeVO"
416:   FromList="OTA_STATUS_SCHM_VALS_VL StatusSchemeValueEO"
417:   SelectList="StatusSchemeValueEO.STATUS_SCHEME_VALUE_ID,
418:     StatusSchemeValueEO.STATUS_SCHEME_VALUE_NAME, StatusSchemeValueEO.DESCRIPTION,
419:     StatusSchemeValueEO.STATUS_SCHEME_ID, StatusSchemeValueEO.STATUS_SCHEME_TYPE,
420:     StatusSchemeValueEO.ACTIVE_FLAG, StatusSchemeValueEO.DEFAULT_FLAG,
421:     ...
422:     StatusSchemeValueEO.STATUS_TYPE_CODE, StatusSchemeValueEO.SCORE"
423:   Where="status_scheme_type = 'ATTENDANCE'">
424:   <EntityUsage Name="StatusSchemeValueEO" Entity="acme.apps.enrollments.model.entity.StatusSchemeValueEO"
425:     JoinType="INNER JOIN"></EntityUsage>
426:   <ViewAttribute Name="StatusSchemeValueId" PrecisionRule="true" EntityAttrName="StatusSchemeValueId"
427:     EntityUsage="StatusSchemeValueEO" AliasName="STATUS_SCHEME_VALUE_ID" />
428:   <ViewAttribute Name="StatusSchemeValueName" PrecisionRule="true" EntityAttrName="StatusSchemeValueName"
429:     EntityUsage="StatusSchemeValueEO" AliasName="STATUS_SCHEME_VALUE_NAME" />
430:   <ViewAttribute Name="Description" PrecisionRule="true" EntityAttrName="Description"
431:     EntityUsage="StatusSchemeValueEO" AliasName="DESCRIPTION" />
432:   <ViewAttribute Name="StatusSchemeId" IsNotNull="true" PrecisionRule="true" EntityAttrName="StatusSchemeId"
433:     EntityUsage="StatusSchemeValueEO" AliasName="STATUS_SCHEME_ID" />
434:   <ViewAttribute Name="StatusSchemeType" IsNotNull="true" PrecisionRule="true"
      EntityAttrName="StatusSchemeType"
435:     EntityUsage="StatusSchemeValueEO" AliasName="STATUS_SCHEME_TYPE" />
436:   <ViewAttribute Name="ActiveFlag" IsNotNull="true" PrecisionRule="true" EntityAttrName="ActiveFlag"
437:     EntityUsage="StatusSchemeValueEO" AliasName="ACTIVE_FLAG" />
438:   <ViewAttribute Name="DefaultFlag" IsNotNull="true" PrecisionRule="true" EntityAttrName="DefaultFlag"
439:     EntityUsage="StatusSchemeValueEO" AliasName="DEFAULT_FLAG" />
440:   ...
441:   <ViewAttribute Name="StatusTypeCode" PrecisionRule="true" EntityAttrName="StatusTypeCode"
442:     EntityUsage="StatusSchemeValueEO" AliasName="STATUS_TYPE_CODE"/>
443:   <ViewAttribute Name="Score" PrecisionRule="true" EntityAttrName="Score"
444:     EntityUsage="StatusSchemeValueEO" AliasName="SCORE"/>
445: </ViewObject>
```

FIG. 4B

```
450: <Entity xmlns="http://xmlns.acme.com/bc4j" Name="StatusSchemeValueEO"
451:    DBObjectType="view" DBObjectName="OTA_STATUS_SCHM_VALS_VL" AliasName="StatusSchemeValueEO"
452:    BindingStyle="OracleName" RowClass="acme.apps.enrollments.model.entity.StatusSchemeValueEOImpl"
453:    DefClass="acme.apps.common.OtaEntityDefImpl" CollClass="acme.apps.common.OtaEntityCache">
454: ...
455: <Attribute Name="StatusSchemeValueId" IsUpdateable="while_insert" IsNotNull="true" Precision="15" Scale="0"
456:    ColumnName="STATUS_SCHEME_VALUE_ID" TableName="OTA_STATUS_SCHM_VALS_VL"
457:    Type="java.lang.Long" ColumnType="NUMBER" SQLType="NUMERIC" PrimaryKey="true"
458:    RetrievedOnUpdate="true" RetrievedOnInsert="true"></Attribute>
459: <Attribute Name="StatusSchemeValueName" IsNotNull="true" Precision="240"
460:    ColumnName="STATUS_SCHEME_VALUE_NAME" TableName="OTA_STATUS_SCHM_VALS_VL"
461:    Type="java.lang.String" ColumnType="VARCHAR2" SQLType="VARCHAR"></Attribute>
462: <Attribute Name="StatusSchemeType" IsNotNull="true" Precision="30"
463:    ColumnName="STATUS_SCHEME_TYPE" TableName="OTA_STATUS_SCHM_VALS_VL"
464:    Type="java.lang.String" ColumnType="VARCHAR2" SQLType="VARCHAR">
465:    <ListValidationBean Name="StatusSchemeType_Rule_0" OnAttribute="StatusSchemeType"
466:       OperandType="LITERAL"
467:       ResId="acme.apps.enrollments.model.entity.StatusSchemeValueEO.StatusSchemeType_Rule_0">
468:       <AttrArray Name="List">
469:          <Item Value="ATTENDANCE"/>
470:          <Item Value="COMPLETION"/>
471:          <Item Value="PASS"/>
472:          <Item Value="ENROLLMENT"/>
473:          <Item Value="GRADE"/>
474:       </AttrArray>
475:    </ListValidationBean>
476: </Attribute>
477: <Attribute Name="StatusTypeCode" Precision="30" Type="java.lang.String" ColumnType="VARCHAR2"
       SQLType="VARCHAR" ColumnName="STATUS_TYPE_CODE"
       TableName="OTA_STATUS_SCHM_VALS_VL">
```

*FIG. 4C*

```
480:     <CompareValidationBean Name="StatusTypeCode_Rule_0"
481:         ResId="acme.apps.enrollments.model.entity.StatusSchemeValueEO.StatusTypeCode_Rule_0"
482:         OnAttribute="StatusTypeCode" OperandType="EXPR" CompareType="EQUALTO">
483:         <OnCondition><![CDATA[!"GRADE".equals(StatusSchemeType)]]></OnCondition>
484:         <TransientExpression><![CDATA[null]]></TransientExpression>
485:     </CompareValidationBean>
486:     <ListValidationBean Name="StatusTypeCode_Rule_4" OnAttribute="StatusTypeCode" OperandType="LITERAL"
487:         ResId="acme.apps.enrollments.model.entity.StatusSchemeValueEO.StatusTypeCode_Rule_4">
488:         <OnCondition><![CDATA["ATTENDANCE".equals(StatusSchemeType)]]></OnCondition>
489:         <AttrArray Name="List">
490:             <Item Value="ATTENDED"/> <Item Value="NOT_ATTENDED"/> <Item Value="NOT_MARKED"/>
491:         </AttrArray>
492:     </ListValidationBean>
493: </Attribute>
494: <Attribute Name="ActiveFlag" IsNotNull="true" Precision="1" Type="java.lang.String" ColumnType="VARCHAR2"
495:     SQLType="VARCHAR" ColumnName="ACTIVE_FLAG" TableName="OTA_STATUS_SCHM_VALS_VL">
496:     <ListValidationBean Name="ActiveFlag_Rule_0" OnAttribute="ActiveFlag" OperandType="LITERAL"
497:         ResId="acme.apps.enrollments.model.entity.StatusSchemeValueEO.ActiveFlag_Rule_0">
498:         <AttrArray Name="List">
499:             <Item Value="Y"/> <Item Value="N"/>
400A:        </AttrArray>
401A:    </ListValidationBean>
402A: </Attribute>
403A: ...
404A: <CompareValidationBean Name="StatusSchemeValueEO_Rule_1"
405A:     ResId="acme.apps.enrollments.model.entity.StatusSchemeValueEO_Rule_1"
406A:     OnAttribute="ActiveFlag" OperandType="LITERAL" CompareType="EQUALTO" CompareValue="Y">
407A:     <OnAttributes> <Item Value="ActiveFlag"/> <Item Value="DefaultFlag"/> </OnAttributes>
408A:     <OnCondition><![CDATA["Y".equals(DefaultFlag)]]></OnCondition>
409A: </CompareValidationBean>
410A: ...
411A: </Entity>
```

FIG. 4D

```
501: <JUnitTestData amName="acme.apps.enrollments.model.applicationModule.EnrollmentSetupAM"
502:     configName="EnrollmentSetupAMLocal">
503:   <setupData>
504:     <testcasedata voname="AttendanceSchemeVO" oneTimeSetup = "false">
505:       <attributeData name="StatusSchemeId" value="EDIT HERE" />
506:       <attributeData name="StatusSchemeValueName" value="EDIT HERE" />
507:       <attributeData name="StatusTypeCode" value="EDIT HERE" />
508:       <attributeData name="SchemeType" value="EDIT HERE" />
509:       <attributeData name="ActiveFlag" value="EDIT HERE" />
510:       <attributeData name="DefaultFlag" value="EDIT HERE" />
511:       ...
512:       <attributeData name="StatusName" value="EDIT HERE" />
513:     </testCaseData>
514:     <testCaseData voName="EnrollmentJustificationVO" oneTimeSetup="false">
515:       <attributeData name="EnrlmtJustificationId" value="EDIT HERE" />
516:       <attributeData name="JustificationText" value="EDIT HERE" />
517:       ...
518:     </testCaseData>
519:     ...
520:   </setupData>
521:   <testCases>
522:     <testCase caseName="EDIT HERE" mode="create">
523:       <testCaseData voName="EDIT HERE">
524:         <attributeData name="EDIT HERE" value="EDIT" />
525:       </testCaseData>
526:       <attributeTester voName="EDIT HERE" attributeName="EDIT HERE">
527:         <validValue value="EDIT HERE" />
528:         <invalidValue value="EDIT HERE" />
529:       </attributeTester>
530:     </testCase>
531:   </testCases>
532: </JUnitTestData>
```

```
561:    HcmApplicationModuleImpl appModule = (HcmApplicationModuleImpl)
                Configuration.createRootApplicationModule(_amName, _configName);
562:    ViewObject[] viewObjects = appModule.getViewObjects();
563:    String[] viewObjectNames = appModule.getViewObjectNames();
564:
565:    writeToXML("<JUnitTestData amName=\"" + _amName + "\" configName=\"" + _configName + "\">");
566:    writeToXML("<setupData>");
567:
568:    for (int i = 0; i < viewObjectNames.length; i++) {
569:        writeToXML("<testCaseData voName=\"" + viewObjectNames[i] + "\" oneTimeSetup=\"false\">");
570:        AttributeDefImpl[] attributeDefs = (AttributeDefImpl[])viewObjects[i].getAttributeDefs();
571:        for (AttributeDefImpl attrDef : attributeDefs) {
572:            if (!barredAttributeList.contains(attrDef.getName()))
573:                writeToXML("<attributeData name=\"" + attrDef.getName() + "\" value=\"EDIT HERE\"/>");
574:        }
575:        writeToXML("</testCaseData>");
576:
577:    }
578:    writeToXML("</setupData>");
579:
580:    genereateTestCaseTags();
581:    writeToXML("</JUnitTestData>");
```

```
601: <JUnitTestData amName="acme.apps.enrollments.model.applicationModule.EnrollmentSetupAM"
602:     configName="EnrollmentSetupAMLocal">
603:   <setupData>
604:     <testCaseData voName="AttendanceSchemeVO" oneTimeSetup="true">
605:       <attributeData name="StatusSchemeValueName" value="Attended Status" />
606:       <attributeData name="Description" value="Attended Description" />
607:       <attributeData name="StatusSchemeId" value="82001" />
608:       <attributeData name="ActiveFlag" value="Y" />
609:       <attributeData name="DefaultFlag" value="N" />
610:       <attributeData name="BusinessGroupId" value="202" />
611:       <attributeData name="StatusTypeCode" value="ATTENDED" />
612:       <attributeData name="StatusSchemeType" value="ATTENDANCE" />
613:     </testCaseData>
614:     <testCaseData voName="StatusSchemeValueVO" oneTimeSetup="false">
615:       <attributeData name="StatusSchemeValueName" value="Pending Approval" />
616:       <attributeData name="StatusSchemeType" value="ENROLLMENT" />
617:       <attributeData name="StatusTypeCode" value="PENDING_APPROVAL" />
618:       <attributeData name="StatusSchemeId" value="82004" />
619:       <attributeData name="ActiveFlag" value="Y" />
620:       <attributeData name="DefaultFlag" value="N" />
621:       <attributeData name="BusinessGroupId" value="202" />
622:       .....
623:     </testCaseData>
624:     .....
625:   </setupData>
626:   <testcases>
627:     <testCase caseName="Test Status Scheme Type" mode="create">
628:       <attributeTester voName="StatusSchemeValueVO" attributeName="StatusSchemeType">
629:         <validValue value="ENROLLMENT" />
630:         <invalidValue value="ENROLLED" />
```

*FIG. 6A*

```
631:            <invalidValue value="ATTENDED" />
632:          </attributeTester>
633:        </testCase>
634:        <testCase caseName="Test Status Type code" mode="create">
635:          <attributeTester voName="AttendanceSchemeVO" attributeName="StatusTypeCode">
636:            <validValue value="ATTENDED" />
637:            <validValue value="NOT_ATTENDED" />
638:            <validValue value="NOT_MARKED" />
639:            <invalidValue value="DID_NOT_ATTEND" />
640:          </attributeTester>
641:        </testCase>
642:        <testCase caseName="A default status must be active" mode="create">
643:          <testCaseData voName="StatusSchemeValueVO">
644:            <attributeData name="DefaultFlag" value="Y" />
645:          </testCaseData>
646:          <attributeTester voName="StatusSchemeValueVO" attributeName="ActiveFlag">
647:            <validValue value="Y" />
648:            <invalidValue value="N" />
649:          </attributeTester>
650:        </testCase>
651:        <testCase caseName="Score is NULL when scheme type is not Grade" mode="create">
652:          <attributeTester voName="StatusSchemeValueVO" attributeName="Score">
653:            <validValue value="" />
654:            <invalidValue value="30" />
655:          </attributeTester>
656:        </testCase>
657:        ....
658:     </testcases>
659: </JUnitTestData>
```

*FIG. 6B*

701: [SUCCESS]test Case:Test Status Scheme Type attributeName: StatusSchemeType validValue: ENROLLMENT
702: [SUCCESS]test Case:Test Status Scheme Type attributeName: StatusSchemeType invalidValue: ENROLLED
703: JBO-acme.apps.enrollments.model.entity.StatusSchemeValueEO.StatusSchemeType_Rule_0: Invalid Scheme type 704: [SUCCESS]test Case:Test Status Scheme Type attributeName: StatusSchemeType invalidValue: ATTENDED
705: JBO-acme.apps.enrollments.model.entity.StatusSchemeValueEO.StatusSchemeType_Rule_0: Invalid Scheme type 706: [SUCCESS]test Case:Test Status Type code attributeName: StatusTypeCode validValue: ATTENDED
707: [SUCCESS]test Case:Test Status Type code attributeName: StatusTypeCode validValue: NOT_ATTENDED
708: [SUCCESS]test Case:Test Status Type code attributeName: StatusTypeCode validValue: NOT_MARKED
709: [SUCCESS]test Case:Test Status Type code attributeName: StatusTypeCode invalidValue: DID_NOT_ATTEND
710: JBO-acme.apps.enrollments.model.entity.StatusSchemeValueEO.StatusTypeCode_Rule_4: Invalid Attendance Type 711: [SUCCESS]test Case:A default status must be active attributeName: ActiveFlag validValue: Y
712: [SUCCESS]test Case:A default status must be active attributeName: ActiveFlag invalidValue: N
713: JBO-acme.apps.enrollments.model.entity.StatusSchemeValueEO_Rule_1: Default status must be active 714: [SUCCESS]test Case:Score is NULL when scheme type is not Grade attributeName: Score validValue:
715: [SUCCESS]test Case:Score is NULL when scheme type is not Grade attributeName: Score invalidValue: 30
716: JBO-acme.apps.enrollments.model.entity.StatusSchemeValueEO.Score_Rule_0: Score can be entered only for Grade scheme

*FIG. 7A*

```
731: this._am = (HcmApplicationModuleImpl) Configuration.createRootApplicationModule
                                        (_amName, _amConfiguration);
732:
733: this.createSetupData(setupData);
734: this.createTestCaseData(testCaseDataList, setupData != null);
735: if ("update".equalsIgnoreCase(testCaseMode))
736:     _am.getTransaction().commit();
737:
738: HcmViewObjectImpl viewObject = (HcmViewObjectImpl) _am.findViewObject(voName);
739: HcmViewRowImpl viewRow = (HcmViewRowImpl) viewObject.getCurrentRow();
740: try {
741:     viewRow.setAttribute(attributeName, convertAttributeValue(viewObject,
                                        attributeName, validValue.value));
742:     _am.getTransaction().validate();
743:     logDebugMessage("[SUCCESS]test Case:" + testCaseName + " attributeName: " +
                                        attributeName + " validValue: " + validValue.value);
744:
745:
746: } catch (Exception e) {
747:     logDebugMessage("[FAIL]test Case:" + testCaseName + " attributeName: " +
                                        attributeName + " validValue: " + validValue.value + "\n" + e.getMessage());
748:
749: }
```

FIG. 7B

```
761: this._am = (HcmApplicationModuleImpl) Configuration.createRootApplicationModule
762:                                        (_amName, _amConfiguration);
763: this.createSetupData(setupData);
764: this.createTestCaseData(testCaseDataList, setupData != null);
765: if ("update".equalsIgnoreCase(testCaseMode))
766:    _am.getTransaction().commit();
767:
768: HcmViewObjectImpl viewObject = (HcmViewObjectImpl) _am.findViewObject(voName);
769: HcmViewRowImpl viewRow = (HcmViewRowImpl) viewObject.getCurrentRow();
770: try {
771:    viewRow.setAttribute(attributeName, convertAttributeValue(viewObject,
772:                                        attributeName, invalidValue.value));
773:    _am.getTransaction().validate();
774:    logDebugMessage("[FAIL]test Case:" + testCaseName + " attributeName: " +
775:                   attributeName + " invalidValue: " + invalidValue.value);
776: } catch (Exception e) {
777:    logDebugMessage("[SUCCESS]test Case:" + testCaseName + " attributeName: " +
778:                   attributeName + " invalidValue: " + invalidValue.value + "\n" + e.getMessage());
779: }
```

*FIG. 7C*

CONFIRMING ENFORCEMENT OF BUSINESS RULES SPECIFIED IN A DATA ACCESS TIER OF A MULTI-TIER APPLICATION

BACKGROUND

Technical Field

The present disclosure relates to testing of multi-tier applications and more specifically to confirming enforcement of business rules specified in a data access tier of a multi-tier application.

Related Art

An application refers to a software program, which on execution performs specific desired tasks. For convenience, an application may be divided into multiple tiers, with each tier providing a disparate and specific utility with appropriate interfaces for interacting with other tiers. The different tiers, executing on the same machine or on different machines connected through a network, operate together to perform the desired tasks.

An example of a multi-tier application is a three-tier application in which a presentation tier provides user interfaces, a business logic tier implements the general computational aspects and a data tier provides a persistent storage for data (e.g. databases). Having such multiple tiers generally enables different tiers to be designed/developed by different groups/vendors, etc., and also simplifies maintenance of the software program/application.

A data access tier is one of the tiers employed to control access to data stored in secondary/persistent storages. Data access tier operates to provide (to higher level tiers) a data model (at abstract levels such as objects, instead of at byte level, etc.), which is independent of the underlying storage type/mechanism, etc. Higher level tiers (hereafter referred to as "interface tiers") are typically designed to access the data using such data models, thereby enabling the access function in the interface tiers to be implemented independent of the storage technique/mechanism.

Business rules specify the conditions to be satisfied for permitting data in the secondary/persistent storage to be accessed (stored/retrieved). For example, a business rule may indicate that the age of an employee must be between 18 and 60, and thus when age is being changed (created or updated), the data access tier automatically ensures that the age condition in the business rule is enforced or verified. However, the conditions can be more complex depending on more than one variable.

There is a general need to check/confirm that the intended (or earlier specified) business rules in a data access tier are enforced when data is accessed in a multi-tier application.

BRIEF DESCRIPTION OF THE DRAWINGS

Example embodiments of the present invention will be described with reference to the accompanying drawings briefly described below.

FIGS. 4A-4D together depicts the manner in which various objects in a data access tier of an enterprise application are implemented and executed (in the context of ADF) in one embodiment.

FIG. 5A depicts a portion of a template indicating attributes in a data access tier that are accessible from the higher interface tiers of a multi-tier application in one embodiment.

FIG. 5B depicts a portion of software code which on execution generates portions of a template (as shown in FIG. 5A) in one embodiment.

FIG. 6A-6B together depicts details of test cases specified by a user using a template (shown in FIG. 5A) in one embodiment.

FIG. 7A depicts portions of a log file containing the results of execution of user specified test cases (as shown in FIGS. 6A-6B) in one embodiment.

FIG. 7B depicts portions of software code executed for testing business rules for valid values in one embodiment.

FIG. 7C depicts portions of software code executed for testing business rules for invalid values in one embodiment.

In the drawings, like reference numbers generally indicate identical, functionally similar, and/or structurally similar elements. The drawing in which an element first appears is indicated by the leftmost digit(s) in the corresponding reference number.

DESCRIPTION OF EXAMPLE EMBODIMENTS

1. Overview

An aspect of the present invention facilitates confirming enforcement of business rules specified in a data access tier of a multi-tier enterprise application. In one embodiment, the attributes in the data access tier that are accessible from a set of higher/interface tiers are programmatically identified and then provided to a user. Accordingly the user may specify test cases for testing enforcement of desired business rules using the attributes provided. The user specified test cases are then programmatically executed to confirm that the desired business rules are enforced in the multi-tier enterprise application.

By identifying and providing the attributes to the user, the specification of the test cases by the user is simplified.

In one embodiment, the identified attributes are provided in the form of a template file, thereby enabling the user to specify test cases by directly modifying portions of the template file (or a copy thereof). Accordingly, the user task of specifying the test cases is further simplified. Further, the results of execution of the test cases are provided to the user in the form of a log file, thereby enabling the user to confirm (manually) that the desired business rules are enforced in the multi-tier application.

Several aspects of the invention are described below with reference to examples for illustration. However one skilled in the relevant art will recognize that the invention can be practiced without one or more of the specific details or with other methods, components, materials and so forth. In other instances, well-known structures, materials, or operations are not shown in detail to avoid obscuring the features of the invention. Furthermore the features/aspects described can be practiced in various combinations, though only some of the combinations are described herein for conciseness.

2. Example Environment

Figure 1:
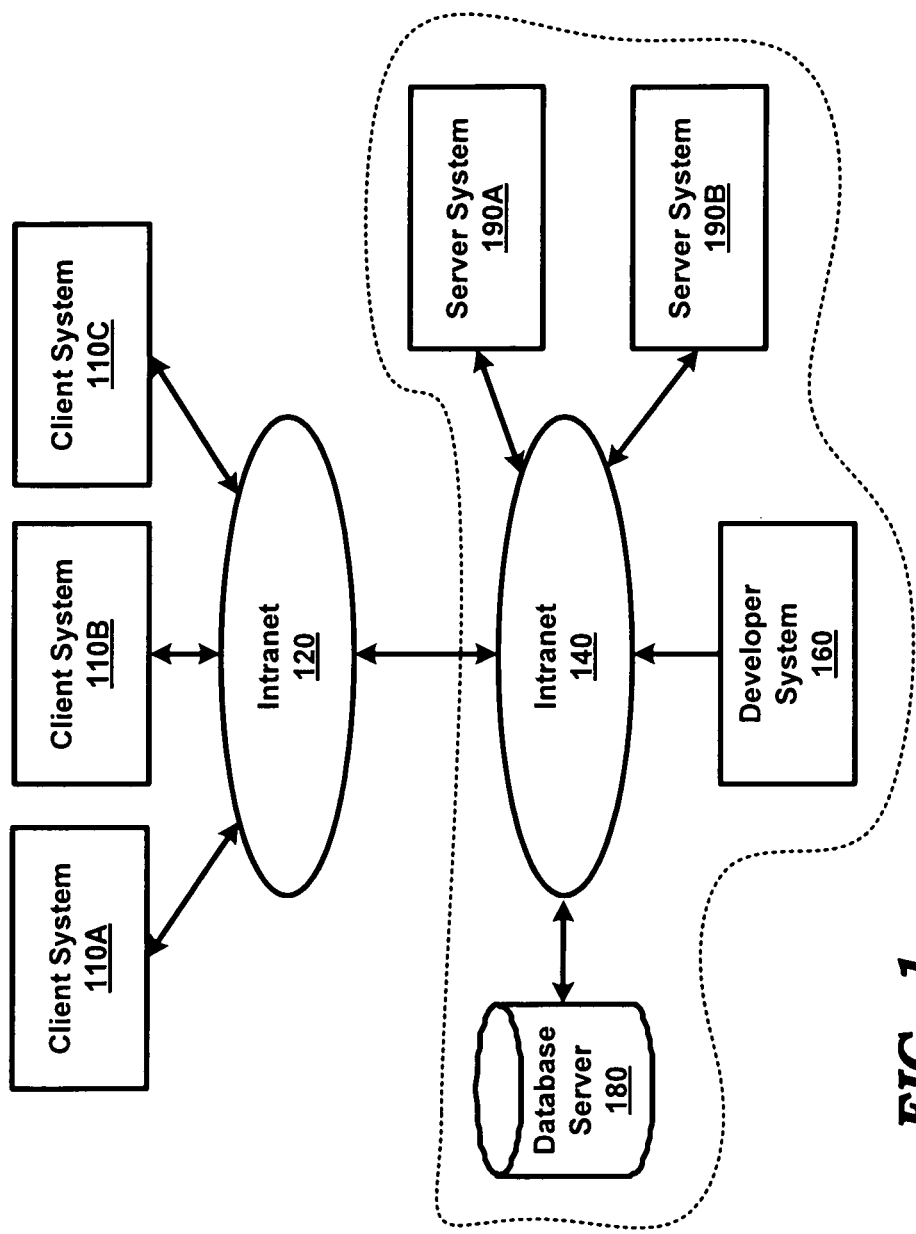
FIG. 1 is a block diagram illustrating an example environment (computing system) in which several aspects of the present invention can be implemented.

FIG. 1 is a block diagram illustrating an example environment (computing system) in which several aspects of the present invention can be implemented. The block diagram is shown containing client systems 110A-110C, Internet 120, intranet 140, developer system 160, database server 180 and server systems 190A-190B.

Merely for illustration, only representative number/type of systems is shown in the Figure. Many environments often contain many more systems, both in number and type, depending on the purpose for which the environment is designed. Each system/device of FIG. 1 is described below in further detail.

Intranet 140 represents a network providing connectivity between server systems 190A-190B, database server 180 and developer system 160, all provided within an enterprise (shown with dotted boundaries). Internet 120 extends the connectivity of these (and other systems of the enterprise) with external systems such as client systems 110A-110C.

Each of intranet 140 and Internet 120 may be implemented using protocols such as Internet Protocol (IP) well known in the relevant arts. In general, in IP environments, an IP packet is used as a basic unit of transport, with the source address being set to the IP address assigned to the source system from which the packet originates and the destination address set to the IP address of the target system to which the packet is to be eventually delivered.

Database server 180 represents a non-volatile storage facilitating storage and retrieval of a collection of data by one or more enterprise applications executing in server systems 190A-190B (typically while processing various client requests). In one embodiment, database server 180 is implemented using relational database technologies and therefore provides storage and retrieval of data using structured queries such as SQL (Structured Query Language). SQL refers to a special-purpose, generally non-procedural language that supports the definition, manipulation, and control of data in systems implementing relational database technologies. However, database server 180 can be implemented using other technologies (e.g., procedural language, hierarchical databases).

Each of client systems 110A-110C represents a system such as a personal computer, workstation, mobile station, etc., used by users to generate (client) requests to enterprise applications executing in server systems 190A-190B. The requests may be generated using appropriate interfaces. In general, a client system requests an application for performing desired tasks and receives corresponding responses containing the results of performance of the requested tasks.

Each of server systems 190A-190B represents a server, such as a web/application server, executing enterprise applications capable of performing tasks requested by users using one of client systems 110A-110C. A server system may perform the tasks on data maintained internally or on external data (stored in database server 180) and then send the result of performance of the tasks to the requesting client system. Each of server systems 190A-190B may also contain other software programs such as operating system, device drivers, etc., (not shown) that provides a (common) run time environment facilitating the execution of the enterprise applications.

As noted above, server systems 190A-190B, database server 180 (together with intranet 140 providing connectivity among the systems) may be implemented in a single "enterprise". In general, the combined systems/servers (excluding the network, which merely provides data transport) shown within the dotted area may be executing an enterprise application, with the various tiers (or components) of the enterprise application being executed on the various systems.

Developer system 160 enables developers/users to implement the desired multi-tier enterprise applications. The implemented multi-tier application may then be deployed on one or more of systems in the enterprise (such as server systems 190A-190B and/or database server 180) for execution. In one embodiment, the various components/tiers of an enterprise application are developed using an application development framework (ADF) as described below with examples.

3. Developing an Application Using an ADF

Figure 2:
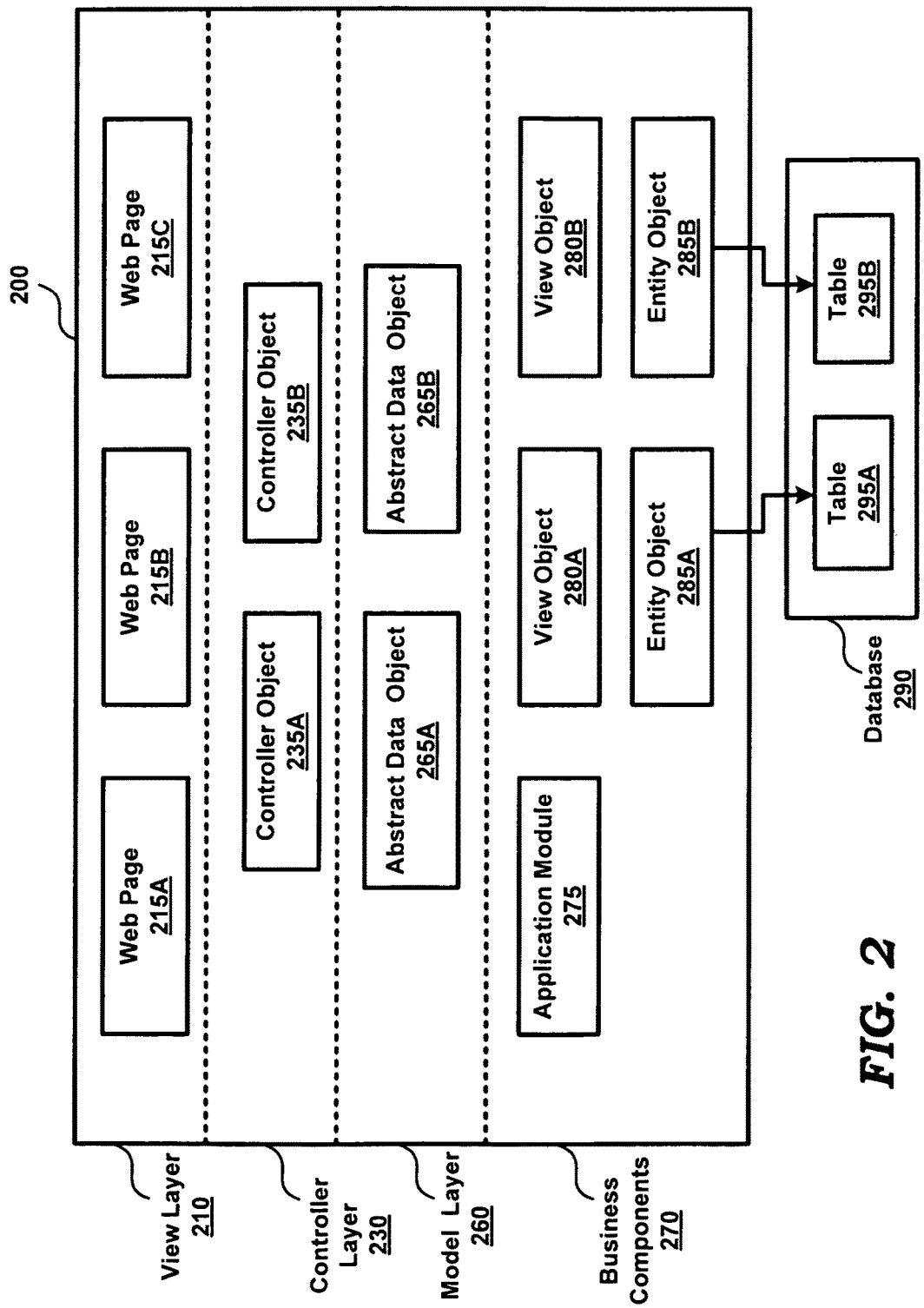
FIG. 2 is a block diagram illustrating the manner in which a multi-tier application is developed using an application development framework (ADF) and later executed within the context of ADF in one embodiment.

FIG. 2 is a block diagram illustrating the manner in which a multi-tier application is developed using an application development framework (ADF) and later executed within the context of ADF in one embodiment. The modules forming the multi-tier application are shown as being within ADF 200 to represent that the modules are developed using ADF and then executed within the context of ADF 200. For conciseness, the various internal details of ADF are not shown within the Figure.

The description is continued assuming that the multi-tier application is developed using Java programming language (available from Sun systems) and Oracle Application Development Framework available as part of JDeveloper, a development tool available from Oracle Corporation. However, the features of the present invention described below may be implemented using any desired combination of programming language and application development framework as will be apparent to one skilled in the relevant arts by reading the disclosure provided herein.

In one embodiment, ADF 200 enables a multi-tier application to be developed as multiple tiers/layers—a view layer containing code modules/files that provide the user interface of the application, a controller layer containing code modules that control the flow of the application, a model layer containing data/code modules that provide an abstract model for the underlying data, a business services layer (or data access tier) containing code modules that provides access to data from various data sources and a data layer containing one or more persistent data sources such as databases.

As noted above, the development of an application using such a tiered/layered approach often simplifies maintenance and reuse of components/code modules across various applications. Further, the independence of each tier from the other tiers results in a loosely coupled service oriented architecture (SOA), which may be desirable when deploying the developed multi-tier enterprise application on multiple/different systems (such as server systems 190A-190B).

Accordingly, the different tiers/layers may be deployed and executed on any of the systems in the enterprise. For example, view layer may be deployed and executed in server system 190A (a web server), while the controller, model and business services layers may be deployed and executed in server system 190B (an application server) and the data layer may be implemented in database server 180.

Referring back to FIG. 2, view layer 210 represents the user interface of the enterprise application being developed. View layer 210 is shown containing web pages 215A-215C, each of which provides a corresponding portion of the user interface and is accessible using a corresponding uniform resource location (URL). The web pages may be sent by the application in response to receiving client requests containing the corresponding URLs. The web pages may then be displayed by a browser on a display unit (not shown) associated with the requesting client system, thereby enabling users using the requesting client system to interact with the enterprise application.

The code files/modules forming the view layer (such as web pages 215A-215C) may be implemented using one or more of hypertext markup language (HTML), Java server pages (JSP), and Java Server Faces (JSF). Alternatively, the user interface may be implemented using Java components such as Swing, and/or extensible markup language (XML).

As noted above, only the relevant user-developed code/data modules are shown in each of the layers/tiers. However, each layer/tier typically contains other pre-defined code/data modules provided by ADF 200. Some of the pre-defined modules may be used during development (in developer system 160), for example, as templates for developing the web pages, for including desired functionality in the developed code etc. Other pre-defined modules (such as a URL rewriting module) may be deployed along with the developed application (in server systems 190A-190B) and may provide additional functionalities (such as mapping of requested URLs to internal names) to the user during execution of the enterprise application.

Controller layer 230 contains code modules/files (such as controller objects 235A-235B) that control the flow of the application. Each of controller objects 235A-235B contains software instructions and/or data implemented according to a desired manner of presenting the web pages in the view layer. The desired manner may include the specific web pages to be displayed when links in another web page are clicked/selected by the user, the page to be displayed when errors occur during execution, indicating the specific data to be stored/retrieved, etc.

The code modules/files forming the controller layer are often implemented as Java servlets receiving the client requests and sending desired web pages as corresponding responses. Controller objects may also be implemented, for example, as Apache Jakarta Struts controllers or according to the JSF (Java Server Faces) standard.

Model layer 260 contains data/code modules (such as abstract data objects 265A-265B) that are independent of the underlying storage type/mechanism, type of business services used to access the underlying data, etc. Higher level layers (such as the view and controlled layers which together form the interface layers) are typically designed to access the data using such data models, thereby enabling the access function (e.g. in web pages 215A-215C) in the higher level layers to be implemented independent of the underlying storage technique/mechanism.

Thus, a business service layer (data access tier) manages interactions with an underlying data persistence layer, while providing to higher level tiers a data model as part of model layer 260. A business service layer also provides such services as object/relational mapping, transaction management, business logic execution, etc. The business services layer may be implemented using one or more of simple Java classes, Enterprise Java Beans, web services, etc.

Business components 270 represents a business service layer implemented, for example, using Oracle Application Development Framework Business Components which provides interaction with relational databases (for example, database 290 maintained in database server 180). The business components framework enables developers to leverage the power of structured query language (SQL) when building Java objects (in the model layer) for accessing databases.

In one embodiment, business components 270 contains a mixture of application modules (such as 275), view objects (such as 280A-280B) and entity objects (such as 285A-285B) which cooperate to provide the business service implementation for the underlying database 290.

Application module 275 is a transactional component/code module that UI clients (such as web pages 215A-215C via controller objects 235A-235B) communicate with for working with application/transaction data. Application module 275 provides an updatable data model and also procedures/functions (commonly referred to as service methods) related to user transactions.

Each of view objects 280A-280B represents a code module designed to execute a corresponding SQL query. The view objects may simplify working with the results of the query as well. The associated SQL query may be used to perform various operations (such as join, project, filter, sort, and/or aggregate) on the stored data as desired by the developer of the application. View objects 280A-280B may also be linked to other view objects to represent master/detail data hierarchies. In ADF 200, it is often necessary to store and retrieve data (to/from database 290) only by using SQL queries associated with view objects.

The results of execution of the SQL queries are maintained and/or manipulated as (one or more) references to underlying entity objects (such as 285A-285B). When the data (in the results) is sought to be modified, the view objects collaborate with the entity objects to consistently validate and save (make permanent) the modifications made to the underlying database 290. In ADF 200, the view and entity objects together provide/expose one or more attributes corresponding to data elements stored in database 290, thereby enabling the higher level layers to access and to modify the desired data elements using the appropriate attributes.

Each of entity objects 285A-285B represents a corresponding row in a database table (e.g., one of table 295A-295B) and simplifies the manipulation (update, deletion, etc.) of the data elements stored in the corresponding row. The columns of the database table may be provided as attributes of the entity objects, with each attribute having an attribute identifier (similar to the column name) and a corresponding value (data element stored in the column).

It should be appreciated that the rows in a single table (e.g. 295A) is represented as multiple instances of the same entity object (type), while rows in different tables are represented as instances of different entity object (types). Further, entity objects 285A-285B may be associated with other entity objects (not shown) to reflect relationships existing between rows stored in the underlying database 290.

Entity objects often encapsulate business rules for the corresponding row which specify the conditions to be satisfied for permitting changes to data elements in the corresponding row (and by extension the table). Accordingly, the business rules encapsulated in an entity object is required to be enforced when the data elements in the corresponding row are accessed (stored/retrieved). The conditions are commonly specified in terms of the attributes (columns) provided/exposed to the higher level layers.

Business rules may indicate the values that can be stored in an attribute, that the value of a corresponding attribute is required to be specified and that the values of an attribute is restricted by (or to) the values specified in another attribute (of the same/different entity/view object). Thus, for a Human Resource application, business rules may be used to verify that the salary of an employee is increased when the employee is promoted, to verify that an employee is given three weeks of vacation after the employee has completed a tenure of three years, to ensure that a job code of an employee is a valid job code when employee data is sought to be added/updated, to ensure that employee data is deleted only when appropriate (e.g., after a fixed period of time and/or by an user having an administrator role) and that any dependencies are checked before deletion, etc.

It should be noted that business rules are different from the business logic embedded in the instructions forming part of the code modules constituting a multi-tier application. Business logic in general is directed to performance of one or more actions in response to receiving corresponding inputs, for example, updating the salary of an employee based on the employee's new role, adding a pre-defined number of leaves that can be availed by an employee in response to determining that the employee has completed a tenure of three years, etc.

In contrast, business rules are directed to ensuring that data (such as those related to the employees of a company) is maintained in a consistent state and accordingly specify conditions that need to be satisfied when the data is accessed (particularly, before it is changed or stored).

It should also be appreciated that though business rules can be specified in the other layers/tiers of the multi-tier application (for example, in web pages 215A-215C), specifying the business rules in a data access tier (such as business components 270) ensures that the business rules are always enforced since all the higher interface tiers are required to access the underlying data using the data access tier. Further duplication of the business rules in different objects of the higher lever layers can be avoided. Thus, there is a general need to confirm that the desired business rules implemented as part of the data access tier are enforced during execution of the multi-tier application.

Several aspects of the present invention facilitate confirming enforcement of business rules specified in a data access tier of a multi-tier application. In one embodiment, such features are operative by execution of executable modules constituting a testing tool (executing in one of server systems 190A-190B or in developer system 160), and accordingly the description below is provided with respect to the testing tool.

4. Confirming Enforcement of Business Rules

Figure 3:
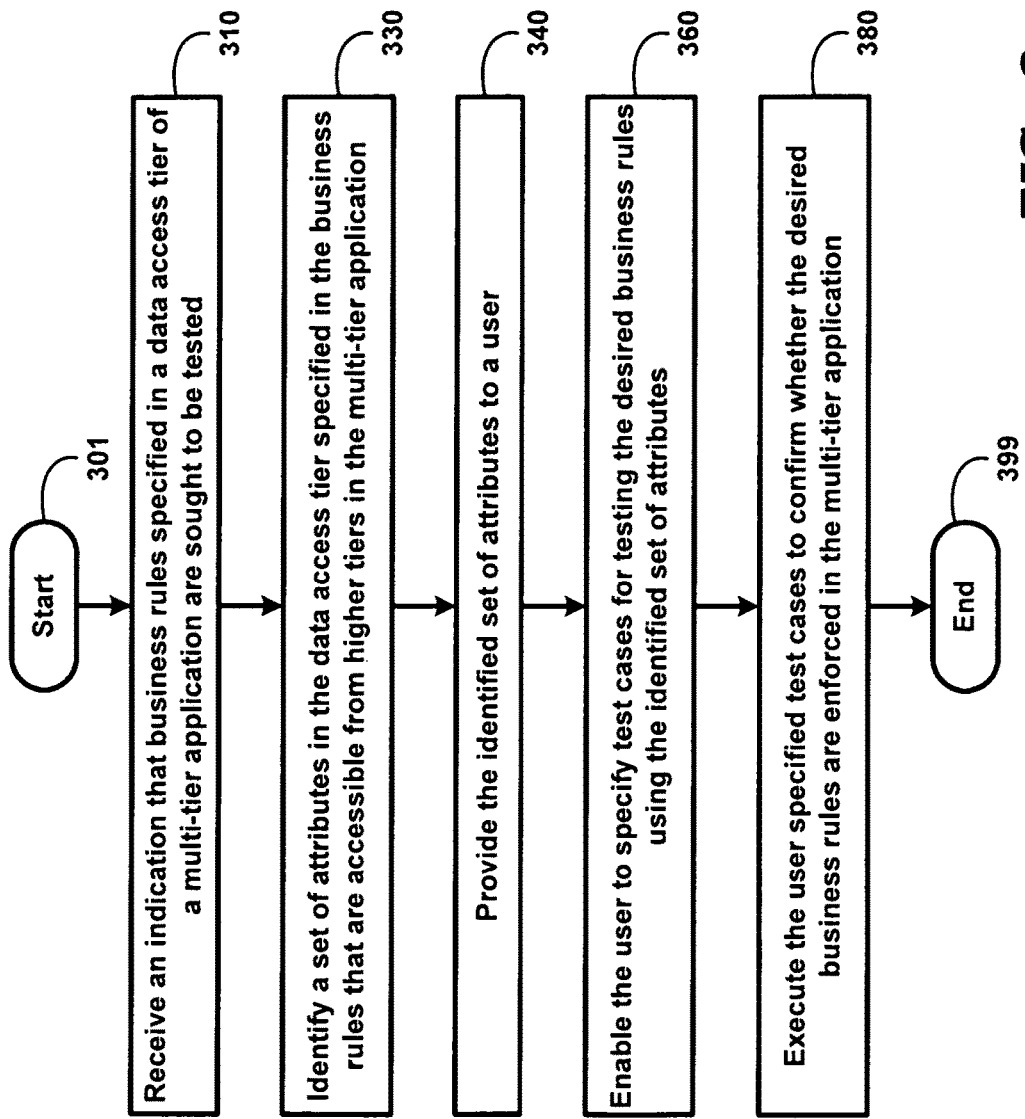
FIG. 3 is a flowchart illustrating the manner in which enforcement of business rules specified in a data access tier of a multi-tier application is tested and confirmed in one embodiment.

FIG. 3 is a flowchart illustrating the manner in which enforcement of business rules specified in a data access tier of a multi-tier application is tested and confirmed in one embodiment. The flowchart is described with respect to FIGS. 1 and 2 merely for illustration. However, various features can be implemented in other environments also without departing from the scope and spirit of various aspects of the present invention, as will be apparent to one skilled in the relevant arts by reading the disclosure provided herein.

In addition, some of the steps may be performed in a different sequence than that depicted below, as suited in the specific environment, as will be apparent to one skilled in the relevant arts. Many of such implementations are contemplated to be covered by several aspects of the present invention. The flow chart begins in step 301, in which control immediately passes to step 310.

In step 310, the testing tool receives an indication that the business rules specified in a data access tier of a multi-tier application are sought to be tested (to confirm that the business rules are enforced during execution of the multi-tier application). The indication may be received from a user/tester (who wants to test the business rules) using one of client systems 110A-110C, server systems 190A-190B and developer system 160. The received indication may indicate that all the business rules are to be tested or alternativley identify the specific ones of the business rules to be tested.

In step 330, the testing tool identifies a set of attributes in the data access tier specified in the business rules that are accessible from higher (interface) tiers in the multi-tier application. The identified set of attributes are contained in one or more objects (such as entity and/or view objects) in the data access tier using which data in underlying database 290 is provided access to the higher level interface layers/tiers. Accordingly, the objects in the data access tier may be queried to determine the attributes that are specified as part of the conditions in business rules and to include the determined attributes in the identified set.

In one embodiment, when the persistent storage in underlying data tier is a relation database such as database 290 containing one or more tables, each of the identified set of attributes corresponds to a column of a table (such as 295A and 295B) in database 290. Each of the attributes in the set is uniquely identified by a corresponding attribute identifier (similar to the name of the corresponding column) and has a corresponding value (data element stored in the column).

In step 340, the testing tool provides the identified set of attributes to a user (e.g. the user from whom the indication was received in step 310 and who wants to test the business rules). For example, the details of each of the identified set of attributes may be displayed on a display unit associated with the system (assumed hereafter to be client system 110A) used by the user.

In one embodiment, the identified set of attributes are provided in the form of a template, which is then then sent to the user and displayed on a display unit associated with the system (client system 110A) used by the user. The template is also stored as a file on a secondary storage, which may then be retrieved and sent in response to receiving future indications (as described with respect to step 310) from the same/different user.

In step 360, the testing tool enables the user to specify test cases for testing the desired business rules using the identified set of attributes (provided in step 340). A test case for testing a business rule typically contains data required to cause execution of the business rule (such as a set of attribute values to be stored), and an expected output (such as whether the business rule will accept or reject the set of attribute values).

The user may specify/create the test cases using appropriate softwares (such as a text editor) executing in client system 110A and then send the test cases to the testing tool (executing in one of server systems 190A-190B or developer system 160) for execution. Alternatively, the test cases may be stored in a shared memory, with the testing tool designed to retrieve the test cases from the shared memory and then execute the retrieved test cases. Thus, the testing tool receives the test cases to be executed based on the attributes provided in step 350.

In one embodiment when the identified set of attributes is provided to the user in the form of a template, the user can edit the provided template (or a copy thereof) to specify the test cases for testing the desired business rules. Accordingly, the user specifies the required attribute values for each of the test cases and also indicates the expected outputs of the test cases. The modified templates may also be stored as files on a secondary storage, with a file containing multiple test cases or portions of a single test case.

In step 380, the testing tool executes the user specified test cases to confirm whether the desired business rules are enforced in the multi-tier application. For execution of a test case, the testing tool first sends a request to the data access tier indicating that the attribute values (specified in the test case) is sought to be stored in database 290 and receives a corresponding response indicating the status ("actual output") of storing the attribute values. The testing tool then compares the actual output to the expected output specified in the test case to determine whether the business rule (sought to be tested by the test case) is enforced. The enforcement of the business rule is confirmed if the actual output is the same as (or similar to) the expected output and is not confirmed otherwise. The flow chart ends in step 399.

Thus, testing tool by identifying and providing the attributes exposed by the data access tier, enables users to specify test cases for testing desired business rule in a convenient manner. Further, the testing tool by executing the user specified test cases assists in confirming enforcement of business rules implemented in the data access tier of a multi tier application.

It may be appreciated that the steps of identifying and providing the attributes of the data access tier and executing the user specified test cases are performed programmatically (that is by execution of executable modules containing software instructions) in contrast to being performed manually by a user (using a mental process for that corresponding task). The manner in which the testing tool programmatically confirms enforcement of business rules in one embodiment is described below with examples.

5. Example Implementation

FIGS. 4A-4D, 5, 6A-6B and 7 together illustrate the manner in which enforcement of business rules specified in a data access tier of a multi-tier application is confirmed in one embodiment. The description is continued assuming that the testing tool is designed to perform confirmation of enforcement of business rules encapsulated in the objects/modules created using ADF 200. Each of the Figures is described in detail below.

FIGS. 4A-4D together depicts the manner in which various objects in a data access tier (business components 270) are implemented and executed (in the context of ADF 200) in one embodiment. Though the content of FIGS. 4A-4C (as well as FIGS. 5, 6A-6B) is shown encoded in extensible markup language (XML) according to one convention, other encoding/formats and conventions may be used for representing the content data.

Broadly, a developer implements the desired application modules, view objects and entity objects in business components 270 by specifying the details of the objects using a graphical user interface provided by a development tool (for example, JDeveloper 10.1.3 available from Oracle Corporation). The development tool then stores the developer specified (and other required) information related to the objects in the form of XML data as described in detail below.

FIG. 4A depicts a portion of XML data representing an application module (such as 275) in one embodiment. Lines 401-414 specify the details of an application module (element "AppModule" between the start tag "<AppModule>" in line 401 and a corresponding end tag "</AppModule>" in line 414) named "EnrollmentSetupAM" (the value of the attribute "Name" in line 301). Lines 402 and 403 respectively specify the classes to be used for creating the application module instance during execution.

As described above with respect to FIG. 2, application modules enable higher level tiers to access view objects by invoking appropriate service methods. Accordingly, lines 404-405 indicate that the view object named "AttendanceSchemVO" (the attribute "Name" in line 404) is accessible via the application module "EnrollmentSetupAM". Line 405 specifies the name of the view object instance created during execution of the enterprise application. Similarly, lines 406-407, 408-409 and 411-412 respectively indicate that the view objects named "EnrollmentJustificationVO", "EnrollmentSchemeVO" and "StatusSchemeValueVO" are also accessible via the application module "EnrollmentSetupAM". The description is continued illustrating the details of a view object that is accessible via the application module "EnrollmentSetupAM".

FIG. 4B depicts a portion of XML data representing a view object (such as 280A or 280B) in one embodiment. Lines 415-445 (element "ViewObject") specify the details of a view object named "AttendanceSchemeVO" (attribute "Name" in line 415). It should be noted that the view object "AttendanceSchemeVO" is provided to the higher level layers via application module "EnrollmentSetupAM" as indicated by lines 404-405 in FIG. 4A.

Lines 417-422 (attribute "SelectList") indicate the specific columns (such as "STATUS_SCHEME_VALUE_ID") that are to be retrieved from the specific tables "OTA_STATUS_SCHM_VALS_VL" (attribute "FromList" in line 416) contained in database 290. Line 423 (attribute "Where") specifies the conditions (such as "status_scheme-type='ATTENDANCE'") that are to be satisfied by the rows retrieved from the tables specified in line 416. Line 424 (element "EntityUsage") specifies the name "StatusSchemeValueEO" of the entity object to be created (and which may correspond to one of entity objects 285A-285B). Line 425 specifies the manner "INNER JOIN" in which the query is to be executed for creating the entity object.

During execution, the above specified information such as the select list, from list, where condition and type of join to perform are used to generate an SQL query, which on execution causes retrieval of data elements from the tables specified in the view object. The retrieved data elements (corresponding to columns in database 290) are then exposed as attributes of an entity object as described below.

Lines 426-427 (element "ViewAtribute") specifies the manner in which a column retrieved from the database is to be mapped to an attribute contained in the entity object. In particular, lines 426-427 indicate that the column "STATUS_SCHEME_VALUE_ID" (attribute "AliasName" in line 427) is to be mapped to the attribute "StatusSchemeValueId" (attribute "EntityAttrName" in line 426) in the entity object "StatusSchemeValueEO" (attribute "EntityUsage" in line 427). Similarly, the other instances of the element "ViewAttribute" in lines 328-344 specify mappings from the retrieved columns to corresponding attributes in the entity object "StatusSchemeValueEO".

Other view objects such as "EnrollmentJustificationVO", "EnrollmentSchemeVO" and "StatusSchemeValueVO" (indicated in lines 406-407, 408-409 and 411-412 of FIG. 4A) may be similarly represented (though the corresponding XML data is not shown here for conciseness). For example, "StatusSchemeValueVO" view object (used in user specified test cases, as described below) is defined similar to the "AttendanceSchemeVO" view object with no "Where" attribute (of line 423), and accordingly specifies mappings from the retrieved columns to corresponding attributes in the entity object "StatusSchemeValueEO".

Thus, the various columns/data elements of one or more tables in database 290 is mapped to corresponding attributes provided/exposed to the higher level layers (in the form of one or more view/entity objects). It may be appreciated that an attribute may also represent a combination of data elements/columns of database 290. The mappings are used to generate an entity object instances, and accordingly the manner in which entity objects are represented is described in detail below.

FIGS. 4C and 4D together depict a portion of XML data representing an entity object (such as 295A or 295B) in one embodiment. Lines 450-411A (element "Entity") specifies the details of an entity object named "StatusSchemeValueEO" (attribute "Name" in line 450). It may be noted that instances of the entity object "StatusSchemeValueEO" are created by the view object "AttendanceSchemeVO" (as indicated in lines 424-425 of FIG. 4B) during execution of the multi-tier application.

Lines 455-458 (element "Attribute") specify details of an attribute, such as the name or identifier of the attribute "StatusSchemeValueId" (attribute "Name" in line 455), the underlying table "OTA_STATUS_SCHM_VALS_VL" and column "STATUS_SCHEME_VALUE_ID" to which the attribute corresponds (attributes "TableName" and "ColumnName" in line 456), the type of the attribute (in line 457), etc. Similarly, the element "Attribute" in lines 459-303A specify the details of other attributes of the entity object "StatusSchemeValueEO".

It may be observed that the attribute named "StatusSchemeType" specified in lines 462-475 is associated with a business rule in lines 465-474 (element "ListValidationBean"). The "ListValidationBean" business rule specifies that data elements stored in the associated attribute "StatusSchemeType" (the value of the attribute "OnAttribute" in line 465) are required to be one of a set of attribute values (specified as "ATTENDANCE", "COMPLETION", "PASS", "ENROLLMENT" and "GRADE" in lines 467-473, element "AttrArray").

Another business rule specified in lines 480-485 (element "CompareValidationBean") indicates that the attribute "StatusTypeCode" cannot be null/blank when the attribute "StatusSchemeType" is set to the attribute value "GRADE" (element "OnCondition" in line 483). A third business rule specified in lines 486-492 (element "ListValidationBean") indicates that the same attribute "StatusTypeCode" (line 486) can have one of the attribute values "ATTENDED", "NOT_ATTENDED" and "NOT_MARKED" (lines 489-491) only when the attribute "StatusSchemeType" is set to the attribute value "ATTENDANCE" (line 488). Thus, a single attribute may have multiple business rules associated with it. In such a scenario, the value of the single attribute is permitted to be changed (updated/created) only when all the associated business rules are satisfied.

It may be observed that the business rule specified in lines 404A-409A is associated with more than one attribute ("ActiveFlag" and "DefaultFlag" inline 407A) and indicates that the attribute "ActiveFlag" can be set to the value "Y" only if the attribute "DefaultFlag" is also set to the value "Y" (implying that a default status scheme is also an active status scheme). On execution, the business rule is checked whenever the values of the attributes "ActiveFlag" and "DefaultFlag" are sought to be changed. Thus, business rules are specified associated with one or more attributes of an entity object.

During execution, ADF 200 creates instances of the application modules, view objects and entity objects in the data access tier to enable higher interface layers to access the data maintained in database 290. For example, ADF 200 may create an instance of the "EnrollmentSetupAM" application module (according to the data shown in FIG. 4A) and provide it for objects in the higher layer, such as web page 215A. In response to the invocation of a service method in the application module (by web page 215A), ADF 200 may create an instance of the "AttendanceSchemeVO" view object, and then generate and execute the SQL query specified in the view object (data shown in FIG. 4B).

On receiving the results of execution of the SQL query, ADF 200 creates instances of the entity object "StatusSchemeValueEO" corresponding to the received results and populates the instances with data elements from database 290 (according to the mappings specified in FIGS. 4C and 4D). ADF 200 then provides the populated instances of the view and query objects to web page 215A (via model layer 260), thereby enabling the web page 215A to access (retrieve and store) the data in database 290 independent of the underlying storage/mechanism.

When web page 215A sends a request to change an attribute, ADF 200 first determines the business rules associated with the attribute (based on the data shown in FIGS. 4C and 4D) and then permits the changes to the attribute only when the conditions of the determined business rules are satisfied. In a scenario that a condition is not satisfied, changes to the attribute is not permitted (and which may then be conveyed to web page 215A in a response to the request). Thus, ADF 200 enforces the business rules specified in the data access tier of a multi-tier application.

It may be desirable (for example, during the development of the multi-tier application) to check/confirm (by testing) that the business rules specified in a data access tier are indeed being enforced. Such a desire may also arise when the multi-tier application is observed to work differently from the expected behavior due to faulty design, non-specification of business rules, etc. The testing tool facilitates confirmation of enforcement of business rules by first providing the attributes accessible from higher level tiers in the form of templates as described below with examples.

6. Providing Attributes as Templates

Testing tool first receives an indication that business rules specified in a data access tier (business components 270) of a multi-tier application (developed using ADF 200) is sought to be tested. In response to receiving the indication, testing tool identifies the set of attributes in the data access tier (specified in business rules) that are accessible from higher tiers in the multi-tier application.

Accordingly, testing tool determines the application modules (such as 275 named "EnrollmentSetupAM") defined in business components 270. Testing tool then parses the XML data corresponding to the determined application module "EnrollmentSetupAM" (shown in FIG. 4A) to determine the view objects (such as 280A named "AttendanceSchemeVO") that are exposed to the higher layers. The testing tool then parses the XML data corresponding to the view object "AttendanceSetupAM" (shown in FIG. 4B) to identify the set of attributes (such as "StatusSchemeValueId", "StatusTypeCode, "Score", etc.) that are accessible from higher tiers of the multi-tier application.

The testing tool then provides the identified set of attributes to a user (who wants to test the business rules). In one embodiment, the identified set of attributes is provided in the form of a template as described below with examples.

FIG. 5A depicts a portion of a template indicating attributes in a data access tier that are accessible from the higher tiers of a multi-tier application in one embodiment. Though the template is shown as generated according to XML format, other types/formats may be used to provide the attributes to a user. The template may be maintained in database 180 or stored in the form of a file on a secondary storage associated with one of server systems 190A-190B.

Lines 501-532 (element "JUnitTestData") depicts a portion of a template provided for testing the application module "EnrollmentSetupAM" (attribute "amName"). In particular, lines 503-520 (element "setupData") specify the attributes identified in the data access tier for different view objects associated with the application module "EnrollmentSetupAM".

Lines 504-513 (element "testCaseData") depicts the attributes identified for the view object "AttendanceSchemeVO" (attribute "voname"), while lines 514-518 depict the attributes identified for another view object "EnrollmentJustificationVO" with each of lines 515-516 depicting the details of a single identified attribute.

Each of lines 505-512 (element "attributeData") depicts the details of a single attribute identified by the testing tool in view object "AttendanceSchemeVO". In particular, line 505 specifies an attribute with identifier "StatusSchemId" and value "EDIT HERE", indicating to the user that the value "EDIT HERE" is to be replaced by the desired value. Similarly, the other lines 506-512 specify the details of other attributes of the view object "AttendanceSchemeVO". It may be observed that the attributes specified in lines 505-512 correspond to the attributes specified in the XML data (lines 426-444 of FIG. 4B) for the "AttendanceSchemeVO" view object.

Lines 521-531 (element "testCases") specify common test case templates provided to users to enable them to specify desired test cases. Lines 522-530 (element "testCase") specifies the details of a single test case template that can be used to check the valid/invalid values (as indicated by lines 527 and 528) accepted by an attribute. The value "create" of attribute "mode" indicates that the testing is to be performed during creation of data (with the value "update" indicating during update of data). Similarly, other test case templates may also be provided as part of the template shown in FIG. 5A.

It may be observed that all the attributes specified in the view objects are being provided as part of the template. However, in alternative embodiments, testing tool may be designed to check whether the attributes specified in view objects have associated business rules (for example, by parsing the XML data shown in FIGS. 4C and 4D corresponding to the entity object) and to provide in the template, only the attributes that are used in at least one business rule.

Thus, testing tool identifies the set of attributes in the data access tier which are accessible from higher tiers and then provides the identified set of attributes in the form of a template. In one embodiment, the identification and generation of the template is programmatically performed by querying the instances (generated by ADF 200) of the application module and view objects as described in detail below.

FIG. 5B depicts a portion of software code which on execution generates portions of a template (as shown in FIG. 5A) in one embodiment. Though the software code in FIG. 5B (as well as in FIGS. 7B and 7C) is shown in terms of pseudo-code similar to Java programming language, several embodiments of present invention can be implemented using other languages and for other formats, without departing from the scope and spirit of the present invention, as will be apparent to one skilled in the relevant arts by reading the disclosure provided herein.

Further, the names of the variables are chosen to closely describe the function (utility) provided by the corresponding variables. While only a skeleton of the program logic is provided for conciseness, it should be appreciated that the implementation of the entire program logic(s) will be apparent to one skilled in the relevant arts by reading the disclosure provided herein.

Lines 561-581 is designed to generate and write the portions of the template to a file stored in a secondary storage associated with one of server system 190A-190B. In line 561, an instance of the application module sought to be tested is created based on the name of the application module (variable "_amName") and a configuration (variable "_configName") and stored in the variable "appModule".

In line 562, view objects associated with the application module are retrieved from the application module instance ("appModule") using the method "getViewObjects" and stored in the variable "viewObjects". In line 563, the names of the view objects are retrieved using the method "getViewObjectNames" provided by the application module instance and stored in the variable "viewObjectsNames". In line 565, the names of the application module and the configuration used is written to the template file (lines 501-502 of FIG. 5A). In line 566, the start tag of the "setupData" element is written to the template file (line 503 of FIG. 5A).

Lines 568-576 are executed for each view object name (as indicated by the outer "for" loop in line 568) to generate the "testcastData" elements of the template file for each of the view objects. In line 569, the name of the view object is written to the template file. In lines 570, the attribute definitions for the view object is retrieved (using the method "getAttributeDefs( )") and stored in the variable "attributeDefs". The inner "for" loop in lines 571-574 are executed for each attribute of the view object and the name of the attibute is written to the template file (in line 573). The "if" condition in line 572 is used to exclude attribute names (as indicated by the variable "bannedAttributeList") from being written to the template file.

Thus, the "for" loops operate together to generate (and write to the template file) the "testcaseData" elements corresponding to the view objects associated with the application module. For example, the "for" loops may generate lines 504-513 of FIG. 5A corresponding to the view object "AttendanceSchemeVO" during a first iteration and the lines 514-518 of FIG. 5A corresponding to the view object "EnrollmentJustificationVO" during a second iteration.

In line 578, the end tag of the "setupData" element is written to the template file (line 520 of FIG. 5A). In line 580, the method "generateTestCaseTags( )" is invoked to generate and write the "testCases" elements to the template file (lines 521-531 of FIG. 5A). In line 581, the end tag of the "JUnitTestData" element is written to the template file (line 531 of FIG. 5A).

Thus, the portions of a template file (shown in FIG. 5A) are programmatically generated by querying the application modules and the view objects. The template file may be provided for editing on a display screen associated with the user (such as client systems 110A-110C). Alternatively, a user may be enabled to edit the template file (or a copy thereof) by using appropriate software (such as XML editors) in client system 110A-110C. The user specified test cases are then executed by the testing tool to confirm that the business rules (sought to be tested in the test cases) are enforced in the multi-tier application as described below with examples.

7. Executing Test Cases

FIG. 6A-6B together depicts details of test cases specified by a user using a template (shown in FIG. 5A) in one embodiment. Several portions of FIGS. 6A-6B are similar to the corresponding portions of the template shown in FIG. 5A, and accordingly only the portions of the template modified by the user is described below.

Lines 604-613 (element "testacaseData") indicates the details of a test case data for the view object "AttendanceSchemeVO" specified by a user based on lines 504-513 of FIG. 5A. For example, line 605 has been generated by the user by replacing the text "EDIT HERE" in line 506 with the value "Attended Status". Other lines have been similarly generated by the user by replacing the text "EDIT HERE" in the appropriate lines of the template with desired values. Similarly, lines 614-623 indicates the details of a test case data for another view object named "StatusSchemeValueVO".

It may be observed that the attribute "oneTimeSetup" of the element "testcaseData" in line 604 is set to "true", indicating that the values specified in the setup data are to stored in the data elements in table/database only once before the execution of any of the test cases. In contrast, the value "false" for the attribute "oneTimeSetup" in line 614 indicates that the values specified in the setup data are used to initialize the view object before calling the appropriate test cases.

Lines 626-658 (element "testCases") indicate the details of the test cases specified by the user. It may be appreciated that only simple test cases (involving valid/invalid values) are shown in the Figure for ease of understanding. However, more complex types of test cases involving conditional equations, multiple attributes, retrieval of attribute values from files, can also be specified In particular, lines 627-633 (element "testCase") indicates a test case named "Test Status Scheme Type" ("caseName") for testing the attribute "StatusSchemeType" ("attributeName") in the view object "StatusSchemeValueVO" ("voName"). The test case further indicates that the attribute is to be checked for the valid value "ENROLLMENT" (line 629) and the invalid values "ENROLLED" and "ATTENDED" (lines 630-631).

A valid value test for an attribute is used to check whether the update of the attribute to the specified value (input) is successful (expected output) while an invalid value test is used to check whether the update is unsuccessful (expected output). In other words, update of the attribute to the valid values must be accepted (or permitted) by the underlying business rule, while the update to the invalid values must be rejected (or not be permitted) by the business rule associated with the attribute.

It is noted that the view object "StatusSchemeValueVO" (indicated in line 614) is defined similar to the "AttendanceSchemeVO" view object (shown in FIG. 4B) and as such the view attribute "StatusSchemeType" corresponds to the similarly named attribute in the entity object "StatusSchemeValueEO" (lines 462-475). Accordingly, the test case named "Test Status Scheme Type" is designed to test the business rule named "StatusSchemeType_Rule_0" (lines 465-474) which indicates that the values of the attribute "StatusSchemeType" is required to be one of the list of values specified in lines 368-372. It may be noted that the valid value "ENROLLMENT" specified in the test case is contained in the list of values (line 371) while the invalid values are not contained in the list.

Similarly, lines 634-641, 642-650 and 651-656 indicate the details of other test cases specified by a user. It may be observed that the test case named "Test Status Type Code" in lines 634-641 is designed to test another view object "AttendanceSchemeVO". Further, the test case named "A default status must be active" in lines 642-650 specifies a test case data (lines 643-645) that is specific for the test case, that is the values specified in the test case data are to be stored in the data element in the table/database before executing the test case.

The testing tool receives the test case data shown in FIGS. 6A-6B and then executes each of the test cases to confirm that the business rules (sought to be tested) are enforced in the multi-tier application. The results of testing/confirmation for each of the test cases may then be provided to the user. In one embodiment, the results of testing is stored in a log file, which is then made available to the same/different user, to enable the user to determine which of the business rules are enforced in the data access tier of the multi-tier application. The manner in which a results log file is provided in one embodiment is described in detail below.

FIG. 7A depicts portions of a log file containing the results of execution of user specified test cases (as shown in FIGS. 6A-6B) in one embodiment. Lines 701-716 indicate the results of execution of the four test cases specified in lines 626-658 of FIGS. 6A-6B.

In particular, lines 701-705 indicate the result of execution of the test case specified in line 627-633. Line 701 indicates the name of the test case "Test Status Scheme Type", the name of the attribute tested "StatusSchemeType", the type of test "validValue" and the input value "ENROLLMENT". Line 701 further contains the text "SUCCESS" indicating that the update of the value of the attribute "StatusSchemeType" to the value "ENROLLMENT" was accepted/successfully performed (as was sought to be tested by line 629). In general, the text "SUCCESS" in the results of a test case indicates that the actual output of the test case was found to be similar to the expected output, with the text "FAIL" used to indicate otherwise.

The result depicted in line 701 may be generated (programmatically) on execution of the software instructions shown in FIG. 7B. Lines 731-749 depict the software instructions that are executed to perform a valid value test (in response to testing tool receiving test cases such as in line 629) and to generate corresponding output in the log result file. In particular, lines 731-732 indicate that an instance of the application module is created based on the application module name "EnrollmentSetupAM" and stored in the variable "_am". In lines 733-736, the values specified in the setup data is stored in the database and the transaction is committed based on the value of the "mode" attribute specified in the test case. In lines 738-739, the view object corresponding the view name "StatusSchemeValueVO" (as indicated by the variable "voName") is generated/retrieved. In lines 740-749, the attribute specified in the test case "StatusSchemeType" is then set to the valid value "ENROLLMENT" (lines 741-742) specified in the test case (line 629) and the values validated (line 743). In a scenario that validation is successful, lines 744-745 are executed (thereby generating line 701 in the log result file) and lines 747-748 are executed otherwise.

Referring to FIG. 7A, line 702 indicates that the invalid value test (as specified in line 630) for the attribute "StatusSchemeType" for the invalid input value "ENROLLED" was successful, with line 703 specifying the details of the error returned by the data access tier. In other words, the update of the value of the attribute "StatusSchemeType" to the value "ENROLLED" was rejected by the related business rule and accordingly resulted in an error. Similarly, line 704 indicates that the invalid value test (as specified in line 631) for the attribute "StatusSchemeType" for the invalid input value "ATTENDED" was successful, with line 705 specifying the details of the corresponding error.

The results depicted in lines 702-705 may be generated on execution of the software instructions shown in FIG. 7C. Lines 761-779 depict the software instructions that are executed to perform an invalid value test (in response to testing tool receiving test cases such as in lines 630 and 631) and to generate corresponding output in the log result file. It may be observed that the software instructions are similar to lines 731-749 of FIG. 7B and accordingly on execution creates instances of the application module, the setup data and view object sought to be tested, sets the attribute specified in the test case "StatusSchemeType" to the invalid value, e.g. "ENROLLED" (line 772-773) and validates the values (line 773). It may be further observed that the results generated in the log result files is exactly the opposite of the results generate by the instructions for the valid value test (shown in FIG. 7B). Accordingly, in a scenario that validation is successful, lines 774-775 are executed (indicating failure) and lines 777-778 are executed otherwise (thereby generating lines 702-705 in the log result file for the test cases shown in lines 628 and 631 respectively).

Referring to FIG. 7A, lines 706-710, 711-713 and 714-716 respectively indicate the results of execution of the test cases specified in lines 634-641, 642-650 and 651-656. It may be appreciated that testing tool may execute other executable/testing modules (containing software code similar to that shown in FIGS. 7B and 7C) corresponding to the other types of test cases and correspondingly generate the results of testing.

Further, each executable/testing module may be designed to test different types of test cases and to provide the corresponding results. For example, the software instructions shown in FIGS. 7B and 7C may be combined into a single set of instructions which on execution generates the output based on the input values as well as the type (valid value/invalid value) of the test case, as will be apparent to one skilled in the relevant arts by reading the disclosure herein.

Thus, the results of execution of the test cases are generated and then provided to the user in the form of a log file. The user (or the testing tool) may inspect the log file to confirm that the business desired rules are indeed enforced (when all the results are indicated to be "SUCCESS" as shown in FIG. 7) in the data access tier of a multi-tier application. The user may also determine the specific business rules that are not enforced based on the test cases whose results are indicated to be "FAIL". The user may then modify the software instructions constituting the multi-tier application, the data/schema used by the application, the business rules, etc. to rectify the error of non-enforcement of the specific business rules.

Thus, in a scenario when the business rules are specified in the data access tier, testing of the enforcement of business rules is performed by bypassing (i.e., the testing is not performed through) the higher tiers and directly interfacing with the data access tier.

It should be further appreciated that the above-described features of testing tool may be implemented in a combination of one or more of hardware, software and firmware (though embodiments are described as being implemented in the form of software instructions). The description is continued with respect to an embodiment in which various features are operative by execution of corresponding executable modules.

8. Digital Processing System

Figure 8:
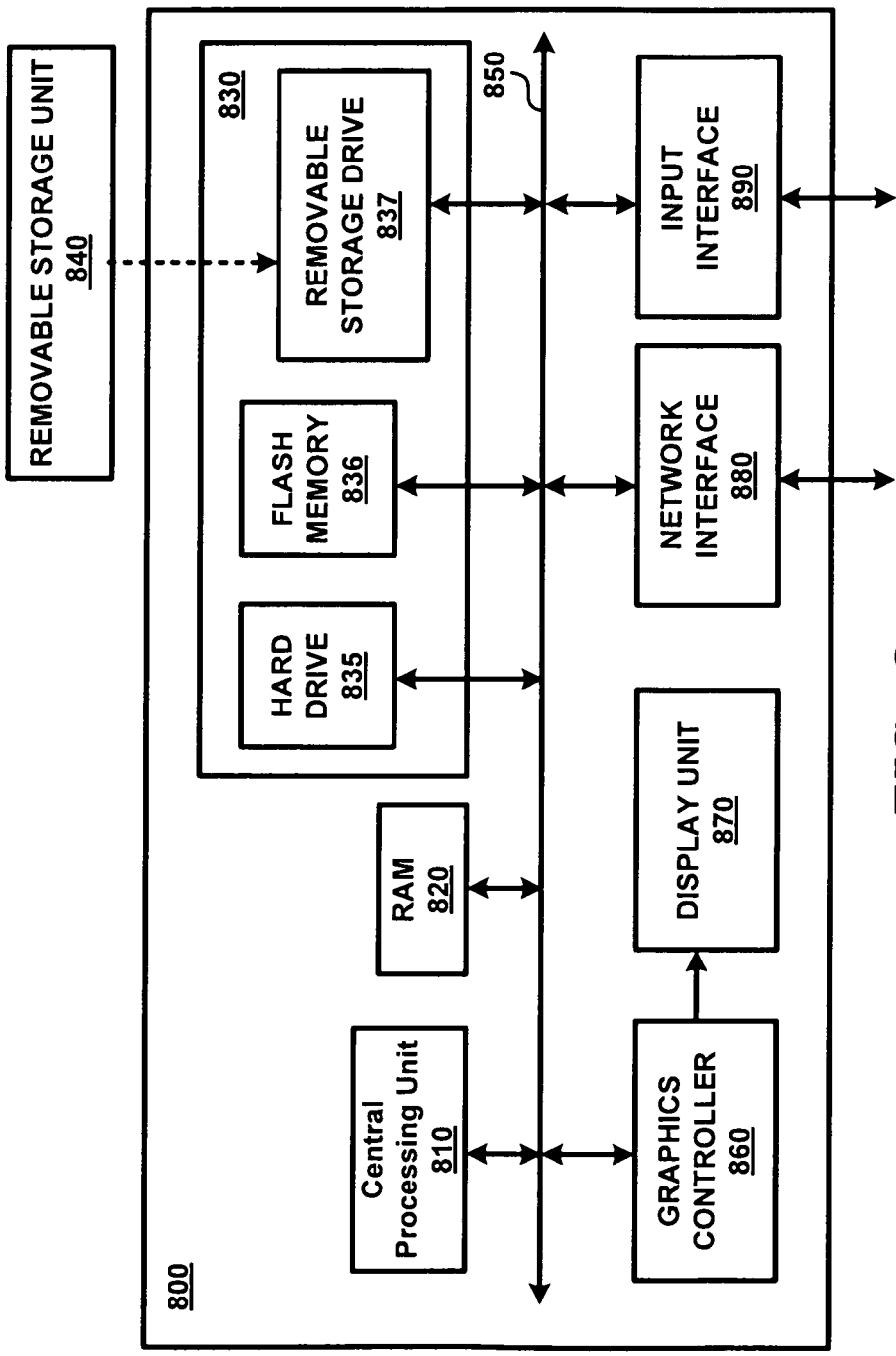
FIG. 8 is a block diagram illustrating the details of digital processing system 800 in which various aspects of the present invention are operative by execution of appropriate software instructions.

FIG. 8 is a block diagram illustrating the details of digital processing system 800 in which various aspects of the present invention are operative by execution of appropriate software instructions. Digital processing system 800 may correspond to any system (such as server systems 190A-190B) implementing the testing tool and/or application development framework.

Digital processing system 800 may contain one or more processors such as a central processing unit (CPU) 810, random access memory (RAM) 820, secondary memory 830, graphics controller 860, display unit 870, network interface 880, and input interface 890. All the components except display unit 870 may communicate with each other over communication path 850, which may contain several buses as is well known in the relevant arts. The components of FIG. 8 are described below in further detail.

CPU 810 may execute instructions stored in RAM 820 to provide several features of the present invention. CPU 810 may contain multiple processing units, with each processing unit potentially being designed for a specific task. Alternatively, CPU 810 may contain only a single general-purpose processing unit. RAM 820 may receive instructions from secondary memory 830 using communication path 850.

Graphics controller 860 generates display signals (e.g., in RGB format) to display unit 870 based on data/instructions received from CPU 810. Display unit 870 contains a display screen to display the images defined by the display signals. Input interface 890 may correspond to a keyboard and a pointing device (e.g., touch-pad, mouse) and may be used to provide inputs.

Network interface 880 provides connectivity to a network (e.g., using Internet Protocol), and may be used to communicate with other connected systems (such as client systems 110A-110C, developer system 160, database server 180) of FIG. 1.

Secondary memory 830 may contain hard drive 835, flash memory 836, and removable storage drive 837. Secondary memory 830 may store the data (e.g., portions of data depicted in FIGS. 4A, 4B, 4C, 5A, 6A, 6B and 7A) and software instructions (e.g., portions of code depicted in FIGS. 5B, 7B and 7C and/or the code/data modules depicted in FIG. 2), which enable digital processing system 800 to provide several features in accordance with the present invention.

Some or all of the data and instructions may be provided on removable storage unit 840, and the data and instructions may be read and provided by removable storage drive 837 to CPU 810. Floppy drive, magnetic tape drive, CD-ROM drive, DVD Drive, Flash memory, removable memory chip (PCMCIA Card, EPROM) are examples of such removable storage drive 837.

Removable storage unit 840 may be implemented using medium and storage format compatible with removable storage drive 837 such that removable storage drive 837 can read the data and instructions. Thus, removable storage unit 840 includes a computer readable (storage) medium having stored therein computer software and/or data. However, the computer (or machine, in general) readable medium can be in other forms (e.g., non-removable, random access, etc.).

In this document, the term "computer program product" is used to generally refer to removable storage unit 840 or hard disk installed in hard drive 835. These computer program products are means for providing software to digital processing system 800. CPU 810 may retrieve the software instructions, and execute the instructions to provide various features of the present invention described above.

It should be understood that numerous specific details, relationships, and methods are set forth to provide a full understanding of the invention. For example, many of the functions units described in this specification have been labeled as modules/blocks in order to more particularly emphasize their implementation independence.

Reference throughout this specification to "one embodiment", "an embodiment", or similar language means that a particular feature, structure, or characteristic described in connection with the embodiment is included in at least one embodiment of the present invention. Thus, appearances of the phrases "in one embodiment", "in an embodiment" and similar language throughout this specification may, but do not necessarily, all refer to the same embodiment.

Furthermore, the described features, structures, or characteristics of the invention may be combined in any suitable manner in one or more embodiments. In the above description, numerous specific details are provided such as examples of programming, software modules, user selections, network transactions, database queries, database structures, hardware modules, hardware circuits, hardware chips, etc., to provide a thorough understanding of embodiments of the invention.

9. Conclusion

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

It should be understood that the figures and/or screen shots illustrated in the attachments highlighting the functionality and advantages of the present invention are presented for example purposes only. The present invention is sufficiently flexible and configurable, such that it may be utilized in ways other than that shown in the accompanying figures.

Further, the purpose of the following Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present invention in any way.

What is claimed is:

1. A computer implemented method facilitating a user to test whether desired business rules are enforced in an enterprise application implemented as a plurality of tiers, said enterprise application being designed to use data stored in a data storage, wherein said data storage contains a plurality of tables, with each table containing a corresponding set of columns, said plurality of tiers including a data access tier and a set of interface tiers, wherein said data access tier specifies, for said enterprise application, a plurality of attributes which are accessible from said set of interface tiers, wherein each attribute is defined to uniquely identify a corresponding column of one of said plurality of tables, wherein said set of interface tiers are provided access to said data in said data storage only through said plurality of attributes specified in said data access tier, wherein each of a plurality of business rules is specified in said data access tier and specifies a corresponding condition which is to be satisfied for permitting a change to a data element stored in said data storage, wherein conditions specified in said set of business rules contain at least some of said plurality of attributes, said method comprising:

receiving an indication from a user that the enforcement of a set of business rules is sought to be tested, wherein said set of business rules is contained in said plurality of business rules;

inspecting programmatically said data access tier to identify a set of attributes contained in said plurality of attributes specified in said data access tier, each of said set of attributes being specified in one of said set of business rules, wherein a first business rule of said set of business rules specifies a first condition containing a first attribute of said set of attributes, said first attribute uniquely identifying a first column of one of said plurality of tables;

providing programmatically said set of attributes including said first attribute to said user to enable said user to create a set of test cases based on said set of attributes, wherein a first test case of said set of test cases is created by incorporating said first attribute, said first test case includes test data for testing said first business rule and an expected result, wherein said test data is specified for storing in said first attribute, wherein said expected result indicates whether said first business rule is expected to operate to accept or reject said test data when said test data is sought to be stored in said first column;

receiving from said user, said set of test cases, including said first test case; and executing programmatically said set of test cases to test whether said set of business rules are enforced in said enterprise application, wherein execution of said first test case generates a validation result indicating whether or not said test data was stored in said first column, wherein comparison of said validation result with said expected result indicates whether said first rule is enforced for said first test case, wherein said receiving said indication, said inspecting, said providing, said receiving and said executing are performed by execution of a set of instructions by a processor.

2. The method of claim 1, wherein said inspecting comprises:

querying a set of objects contained in said data access tier; and receiving said set of attributes from said set of objects in response, wherein said set of attributes are provided to said user to enable the user to specify said set of test cases.

3. The method of claim 2, further comprising generating a template containing said set of attributes, wherein said template is displayed to said user in order to provide said set of attributes, wherein said template identifies the attribute names corresponding to the columns of a table contained in said plurality of tables.

4. The method of claim 1, wherein said first test case is designed to check whether a valid value for said first attribute would be accepted for storing in said data storage and a second test case is designed to check whether a invalid value for said first attribute would be rejected, wherein said first test case and said second test case are comprised in said set of test cases.

5. The method of claim 4, wherein said executing comprises:

executing a first set of instructions using said valid value for said first attribute; and executing a second set of instructions using said invalid value for said second attribute.

6. The method of claim 1, further comprising:
providing the result of said comparing for each of said set of test cases to said user,
whereby said user can verify whether said set of business rules are enforced in said enterprise application.

7. A non-transitory computer readable medium storing executable code which can be executed by one or more processors of a system, said executable code comprising:
a first set of instructions forming a plurality of tiers of an enterprise application designed to use data stored in a data storage, wherein said data storage contains a plurality of tables, with each table containing a corresponding set of columns,
wherein said plurality of tiers includes a data access tier and a set of interface tiers, wherein said data access tier specifies, for said enterprise application, a plurality of attributes which are accessible from said set of interface tiers, wherein each attribute is defined to uniquely identify a corresponding column of one of said plurality of tables,
wherein said set of interface tiers are provided access to said data in said data storage only through said plurality of attributes specified in said data access tier,
wherein each of a plurality of business rules are specified in said data access tier and specifies a corresponding condition which is to be satisfied for permitting a change to a data element stored in said data storage, wherein conditions specified in said set of business rules contain at least some of said plurality of attributes; and
a second set of instructions upon execution by said one or more processors designed to test enforcement of a set of business rules in said data access tier, wherein said set of business rules is contained in said plurality of business rules, wherein said second set of instructions upon execution by said one or more processors causes said system to perform the actions of:
receiving an indication from a user that the enforcement of a set of business rules is sought to be tested, wherein said set of business rules is contained in said plurality of business rules;
inspecting said data access tier to identify a set of attributes contained in said plurality of attributes specified in said data access tier, each of said set of attributes being specified in one of said set of business rules, wherein a first business rule of said set of business rules specifies a first condition containing a first attribute of said set of attributes, said first attribute uniquely identifying a first column of one of said plurality of tables;
providing said set of attributes including said first attribute to said user to enable said user to create a set of test cases based on said set of attributes, wherein a first test case of said set of test cases is created by incorporating said first attribute, said first test case includes test data for testing said first business rule and an expected result,
wherein said test data is specified for storing in said first attribute, wherein said expected result indicates whether said first business rule is expected to operate to accept or reject said test data when said test data is sought to be stored in said first column;
receiving from said user, said set of test cases, including said first test case; and
executing said set of test cases to test whether said set of business rules are enforced in said enterprise application,
wherein execution of said first test case generates a validation result indicating whether or not said test data was stored in said first column,
wherein comparison of said validation result with said expected result indicates whether said first rule is enforced for said first test case.

8. The non-transitory computer readable medium of claim 7, wherein said identifying comprises:
querying a set of objects contained in said data access tier; and
receiving said set of attributes from said set of objects in response,
wherein said set of attributes are provided to said user to enable the user to specify said set of test cases.

9. The non-transitory computer readable medium of claim 8, further comprising generating a template containing said set of attributes, wherein said template is displayed to said user in order to provide said set of attributes,
wherein said template identifies the attribute names corresponding to the columns of a table contained in said plurality of tables.

10. The non-transitory computer readable medium of claim 7, wherein said first test case is designed to check whether a valid value for said first attribute would be accepted for storing in said data storage and a second test case is designed to check whether a invalid value for said first attribute would be rejected,
wherein said first test case and said second test case are comprised in said set of test cases.

11. The non-transitory computer readable medium of claim 10, wherein said executing comprises:
executing a first set of instructions using said valid value for said first attribute; and
executing a second set of instructions using said invalid value for said second attribute.

12. The non-transitory computer readable medium of claim 7, wherein said second set of instructions further causes said system to perform the actions of:
providing the result of said executing of each of said set of test cases to said user,
whereby said user can verify whether said set of business rules are enforced in said enterprise application.

13. A computing system comprising:
a data storage to store data in the form of a plurality of tables, with each table containing a corresponding set of columns;
a plurality of server systems to execute a plurality of tiers of an enterprise application, said enterprise application designed to use said data stored in said data storage,
wherein said plurality of tiers includes a data access tier and a set of interface tiers, wherein said data access tier specifies, for said enterprise application, a plurality of attributes which are accessible from said set of interface tiers, wherein each attribute is defined to uniquely identify a corresponding column of one of said plurality of tables,
wherein said set of interface tiers are provided access to said data in said data storage only through said plurality of attributes specified in said data access tier,
wherein each of a plurality of business rules is specified in said data access tier and specifies a corresponding condition which is to be satisfied for permitting a change to a data element stored in said data storage, wherein conditions specified in said set of business rules contain at least some of said plurality of attributes;

a client system to enable a user to send an indication that the enforcement of a set of business rules is sought to be tested, wherein said set of business rules is contained in said plurality of business rules; and a testing tool operable to:

inspect said data access tier, in response to receiving said indication, to identify a set of attributes specified in said data access tier, said set of attributes being contained in said plurality of attributes and each of said set of attributes being specified in one of said set of business rules, wherein a first business rule of said set of business rules specifies a first condition containing a first attribute of said set of attributes, said first attribute uniquely identifying a first column of one of said plurality of tables;

provide said set of attributes, including said first attribute to said user on said client system, wherein said user is facilitated to create a set of test cases based on said set of attributes, wherein a first test case of said set of test cases is created by incorporating said first attribute, said first test case includes test data for testing said first business rule and an expected result, wherein said test data is specified for storing in said first attribute, wherein said expected result indicates whether said first business rule is expected to operate to accept or reject said test data when said test data is sought to be stored in said first column;

receive from said user on said client system, said set of test cases, including said first test case; and execute said set of test cases to test whether said set of business rules are enforced in said enterprise application, wherein execution of said first test case generates a validation result indicating whether or not said test data was stored in said first column, wherein comparison of said validation result with said expected result indicates whether said first rule is enforced for said first test case.

14. The computing system of claim 13, wherein said testing tool to identify said set of attributes queries a set of objects contained in said data access tier and receives said set of attributes from said set of objects in response, wherein said testing tool provides said set of attributes to said user in the form of a template that is displayed to said user.

15. The computing system of claim 13, wherein said set of test cases also includes a second test case, wherein said first test case is designed to check whether a valid value for said first attribute would be accepted for storing in said data storage and said second test case is designed to check whether a invalid value for said first attribute would be rejected, wherein said testing tool executes said first test case by executing a first set of instructions using said valid value for said first attribute and executes said second test case by executing a second set of instructions using said invalid value for said second attribute.

16. The computing system of claim 13, wherein said testing tool is further operable to generate a template containing said set of attributes, wherein said template is displayed to said user in order to provide said set of attributes, wherein said template identifies the attribute names corresponding to the columns of a table contained in said plurality of tables.

17. The computing system of claim 13, wherein said testing tool is further operable to provide the result of said comparison for each of said set of test cases to said user, whereby said user can verify whether said set of business rules are enforced in said enterprise application.

\* \* \* \* \*

UNITED STATES PATENT AND TRADEMARK OFFICE
CERTIFICATE OF CORRECTION

PATENT NO. : 10,445,675 B2
APPLICATION NO. : 12/477905
DATED : October 15, 2019
INVENTOR(S) : Sallakonda et al.

Page 1 of 1

It is certified that error appears in the above-identified patent and that said Letters Patent is hereby corrected as shown below:

In the Specification

In Column 8, Line 1, delete "alternativley" and insert -- alternatively --, therefor.

In Column 14, Line 30, delete "attibute" and insert -- attribute --, therefor.

In Column 14, Line 62, delete "FIG." and insert -- FIGS. --, therefor.

In Column 15, Line 15, delete "to" and insert -- to be --, therefor.

In Column 15, Line 28, delete "specified" and insert -- specified. --, therefor.

Signed and Sealed this
Eighth Day of September, 2020

Andrei Iancu
*Director of the United States Patent and Trademark Office*